J. W. EATON.
NUT-LOCK.
No. 192,620. Patented July 3, 1877.
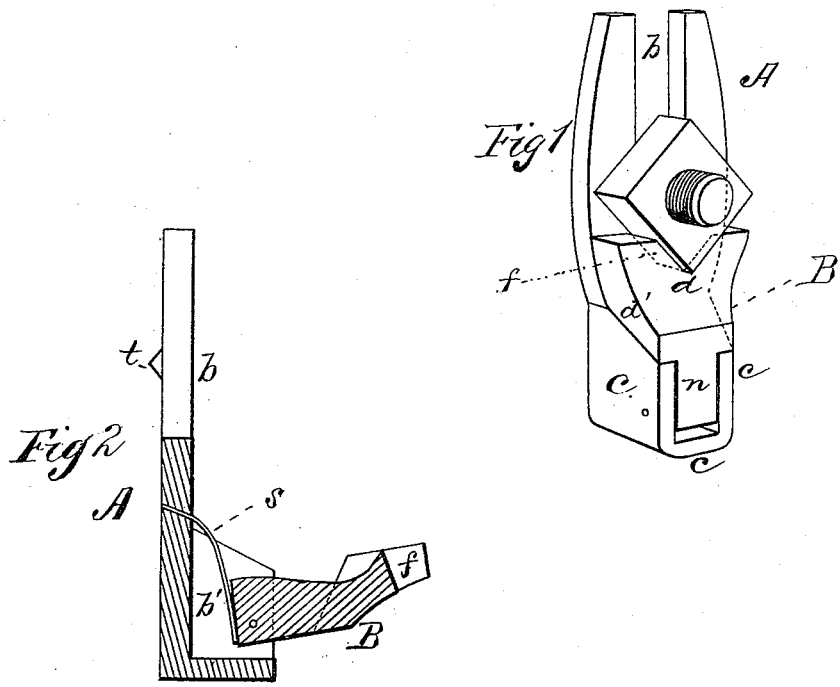
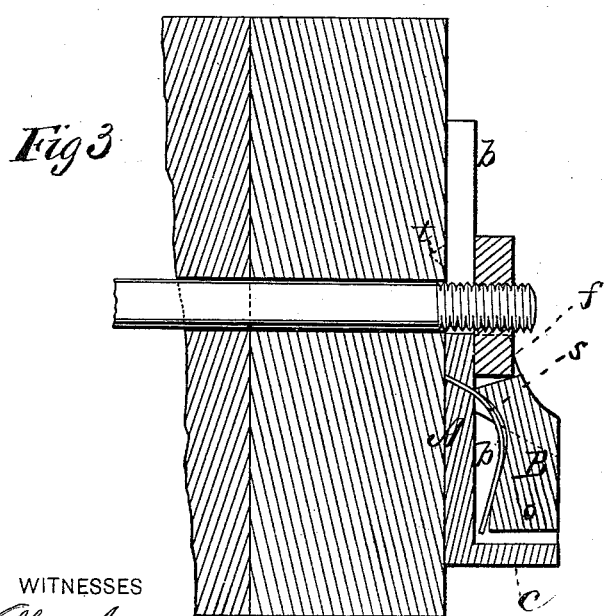
WITNESSES
Villette Anderson.
Frank J. Masi
INVENTOR
James W. Eaton,
by E. W. Anderson.
ATTORNEY

UNITED STATES PATENT OFFICE.

JAMES W. EATON, OF CHANUTE, KANSAS, ASSIGNOR OF ONE-HALF HIS RIGHT TO JOHN W. COLE AND GEORGE W. ADAMS, OF SAME PLACE.

IMPROVEMENT IN NUT-LOCKS.

Specification forming part of Letters Patent No. 192,620, dated July 3, 1877; application filed May 5, 1877.

*To all whom it may concern:*

Be it known that I, JAMES W. EATON, of Chanute, in the county of Neosho and State of Kansas, have invented a new and valuable Improvement in Nut-Locks; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my improved nut-lock applied. Fig. 2 is a longitudinal section thereof, with the dog thrown back, and Fig. 3 is a longitudinal section of the nut-lock applied.

This invention has relation to improvements in nut-locks; and it consists in the construction and novel arrangement of an oblong furcated metallic washer-plate, having at its heel a recess with raised shoulders, between which is journaled a vibrating spring-actuated pivoted locking-dog, having a notch in its end whereby nuts will be prevented from working loose on their bolts, as will be hereinafter more fully explained.

In the annexed drawings, the letter A designates the oblong metallic washer plate, having at one end a deep slot, $b$, adapted to receive and straddle the bolt. This washer has at its heel a recess, $b'$, formed by raised shoulders $c$ in line with slot $b$ above described, and in this recess above described is seated a metallic spring, $s$, for a purpose hereinafter explained.

The front walls of shoulders $c$ are beveled from above downward. B designates a metallic locking-dog that is pivoted by its shank $n$ between shoulders $c$, and $d$ designates its head, the rear walls of which are beveled to correspond to the beveled edges of the walls of the shoulders $c$, as shown at $a'$. The free end of dog B is provided with an angular notch, $f$.

The operation of my improved nut-lock is as follows:

Having thrust the dog back from the washer-plate A the slot of the latter is exposed from end to end, and it is ready to be adjusted on the bolt. The latter having been passed through the materials to be coupled, the washer-plate is put straddlewise of its projecting screw-threaded end. The nut is then forcibly set up on the bolt until sufficiently tight. In this position the angles of the nut should be in line with the length of slot $b$ of the washer-plate. The locking-dog B is then sprung down upon the said washer-plate, when the angle of the nut adjacent thereto will be received in the angular notch $f$ of the head, and the nut is by this means prevented from backward rotation. The dog B is held in this position by means of the spring $s$ aforesaid.

The rear surface of the washer-plate is usually provided with spurs $t$ projecting out therefrom, which, by taking hold upon the beam or other article joined by the bolt, will hold the nut-lock firmly in position.

My improved nut-lock will be found especially useful in its application to fish-bars of rail-joints, but may be used in any other relations.

What I claim as new, and desire to secure by Letters Patent, is—

1. The nut-lock, consisting of the bifurcated washer-plate A, having a spring-actuated and pivoted locking-dog, B, and a notch to receive an angle of the nut, substantially as specified.

2. The combination, with a bolt and its nut, of the longitudinally-slotted washer-plate A and a spring-actuated and pivoted locking-dog, B, substantially as specified.

3. The washer-plate A, having longitudinal slot $b$, the raised shoulders $c$, and the spring $s$ recessed therein, in combination with the vibrating locking-dog, having an enlarged head, with notch $f$, adapted to be sprung down upon the washer-plate for holding a nut against backward rotation, substantially as specified.

In testimony that I claim the above I have hereunto subscribed my name in the presence of two witnesses.

JAMES W. EATON.

Witnesses:
  JNO. P. CONE,
  J. C. CARPENTER.